US012549226B2

(12) United States Patent
Zuo et al.

(10) Patent No.: US 12,549,226 B2
(45) Date of Patent: Feb. 10, 2026

(54) COMMUNICATION SYSTEM DESIGN METHOD BASED ON INTELLIGENT OMNI-SURFACE

(71) Applicant: CHINA INFORMATION CONSULTING & DESIGNING INSTITUTE CO., LTD, Nanjing (CN)

(72) Inventors: Jiakuo Zuo, Nanjing (CN); Chenming Zhu, Nanjing (CN); Qiang Wang, Nanjing (CN); Fengqiang Peng, Nanjing (CN)

(73) Assignee: CHINA INFORMATION CONSULTING & DESIGNING INSTITUTE CO., LTD, Nanjing (CN)

( * ) Notice: Subject to any disclaimer, the term of this patent is extended or adjusted under 35 U.S.C. 154(b) by 19 days.

(21) Appl. No.: 18/578,068

(22) PCT Filed: Jul. 28, 2022

(86) PCT No.: PCT/CN2022/108546
§ 371 (c)(1),
(2) Date: Jan. 10, 2024

(87) PCT Pub. No.: WO2023/155381
PCT Pub. Date: Aug. 24, 2023

(65) Prior Publication Data
US 2024/0405816 A1    Dec. 5, 2024

(30) Foreign Application Priority Data

Feb. 18, 2022   (CN) .......................... 202210151425.7

(51) Int. Cl.
*H04B 7/0456* (2017.01)
*H04B 7/04* (2017.01)
*H04B 7/0426* (2017.01)

(52) U.S. Cl.
CPC ....... *H04B 7/0465* (2013.01); *H04B 7/04013* (2023.05); *H04B 7/043* (2013.01)

(58) Field of Classification Search
CPC .. H04B 7/0465; H04B 7/04013; H04B 7/043; H04B 7/0617; Y02D 30/70; H04W 24/02; H04W 52/02; H04L 41/145
See application file for complete search history.

(56) References Cited

U.S. PATENT DOCUMENTS

2023/0413069 A1\* 12/2023 Zhang ................. H04W 52/143
2024/0333340 A1\* 10/2024 Zuo .................... H04B 7/04013

OTHER PUBLICATIONS

Jianyue Zhu, Youngmin Huang, Jiaheng Wang, Keivan Navaie, and Zhiguo Ding, "Power Efficient IRS-Assisted NOMA", Feb. 2021, IEEE Transaction on Communications, vol. 69. p. 900-913 (Year: 2021).\*

\* cited by examiner

*Primary Examiner* — Sung S Ahn
(74) *Attorney, Agent, or Firm* — CBM PATENT CONSULTING, LLC

(57) ABSTRACT

It discloses a communication system design method based on an intelligent omni-surface, comprising step 1: constructing an optimization problem by minimizing a total power consumption of the communication system as an objective function, the communication system being a communication system based on an intelligent omni-surface; step 2: setting a constraint condition for the optimization problem constructed in the step 1, the constraint condition comprising a minimum rate constraint of a user, a phase shift constraint of the intelligent omni-surface and a length constraint of an allocated time slot; and step 3: solving the optimization problem after setting with the constraint condition to obtain solution for minimizing the total power consumption of the system. When lowest rate requirements of all users are met, (Continued)

the method reduces the total power consumption of the system and realizes omnidirectional coverage of a communication area, and has a good application value.

9 Claims, 3 Drawing Sheets

COMMUNICATION SYSTEM DESIGN METHOD BASED ON INTELLIGENT OMNI-SURFACE

TECHNICAL FIELD

The present invention relates to a communication system design method, and particularly, to a communication system design method based on an intelligent omni-surface.

BACKGROUND

In the future, 6G wireless communication network will realize "intelligent connection", "deep connection", "holographic connection" and "ubiquitous connection", and the realization of this vision requires that the communication network can meet "a connection capacity of hundreds of billions of devices", "an access rate like an optical fiber" and "a zero delay experience", which poses new and great challenges to the next generation communication network. An intelligent omni-surface is a new wireless communication technology and a passive device, which has the characteristics of low power consumption, full-band response and easy deployment, and is considered as one of the most promising technologies to solve difficulties faced by the wireless communication network in the future.

The existing research on intelligent reflecting surface technology only considers the situation that both a user and a base station are distributed on the same side of the intelligent omni-surface, that is, the intelligent reflecting surface can only reflect a signal from base station or the user, but for the user distributed on the back of the intelligent reflecting surface, a communication coverage cannot be achieved. Therefore, the traditional intelligent reflecting surface can only achieve the coverage of a semi-communication area, but cannot achieve the 360° omnidirectional coverage of the communication area. Based on this situation, the present invention proposes a communication system design method based on an intelligent omni-surface, and optimizes the system with the goal of minimizing a total power consumption of the system.

SUMMARY

Object of the present invention: the technical problem to be solved by the present invention is to provide a communication system design method based on an intelligent omni-surface, aiming at the shortcomings in the prior art.

In order to solve the technical problem, the present invention discloses a communication system design method based on an intelligent omni-surface, comprising a computer readable medium operable on a computer with memory for communication system design method, and comprising program instructions for executing the following steps of:

step 1: constructing an optimization problem by minimizing a total power consumption of the communication system as an objective function, the communication system being a communication system based on an intelligent omni-surface;

step 2: setting a constraint condition for the optimization problem constructed in the step 1, the constraint condition comprising: a minimum rate constraint of a user, a phase shift constraint of the intelligent omni-surface and a length constraint of an allocated time slot; and step 3: solving the optimization problem after setting with the constraint condition to obtain an optimization solution for minimizing the total power consumption of the system.

The intelligent omni-surface in the step 1 of the present invention is applied to an uplink communication, and a user communicates with a base station under the assistance of the intelligent omni-surface.

Each element of the intelligent omni-surface in the step 1 has two working modes, which are a reflection mode and a transmission mode; wherein, in the reflection mode, each element is capable of reflecting an incident signal; in the transmission mode, the incident signal is capable of being transmitted through the element of the intelligent omni-surface; the intelligent omni-surface works by using a time slot switching protocol, and two time slots are provided, which are a time slot 1 and a time slot 2; in the time slot 1 respectively, all elements of the intelligent omni-surface work in the reflection mode, and the covered communication area is a reflection area; and in the time slot 2, all elements of the intelligent omni-surface work in the transmission mode, and the covered communication area is a transmission area.

The optimization problem in the step 1 is as follows:

$$\min_{p_k, t_k > 0, \theta_m^k} (p_1 + p_2)$$

wherein, $(p_1+p_2)$ is the total power consumption of the system, $p_k$ is a transmit power of a user k, $t_k$ is a length of a time slot k, and $\theta_m^k$ is a phase shift of an $m^{th}$ element of the intelligent omni-surface in the time slot k.

The constraint condition in the step 2 of the present invention comprises:

a constraint condition 1: $R_k \geq R_k^{min}, k \in \{1, 2\}$ a constraint condition 2: $\theta_m^k \in [0, 2\pi), k \in \{1, 2\}, m \in \{1, 2, \ldots, M\}$ a constraint condition 3: $t_1 + t_2 = 1, 0 < t_1 < 1, 0 < t_2 < 1$ wherein, $R_k^{min}$ is a minimum rate threshold value of the user k, $\pi$ is a ratio of circumference to diameter, M is a total number of the elements contained in the intelligent omni-surface, $$R_k = t_k \log_2 \left( 1 + \frac{p_k |h^H \Theta_k g_k|^2}{\sigma^2} \right)$$

is an achievable data rate of the user k, $h \in C^{M \times 1}$ is a channel vector between the intelligent omni-surface and the base station, $g_k \in C^{M \times 1}$ is a channel vector between the user k and the intelligent omni-surface, $\Theta_1 = \text{diag}\{e^{j\theta_{11}} e^{j\theta_{21}} \ldots e^{j\theta_{M1}}\}$ and $\Theta_2 = \text{diag}\{e^{j\theta_{12}} e^{j\theta_{22}} \ldots e^{j\theta_{M2}}\}$ are a reflected beamforming matrix and a transmitted beamforming matrix respectively, $\sigma^2$ is a variance of an additive white Gaussian noise, $C^{M \times 1}$ represents a complex column vector of M dimension, $|\cdot|^2$ represents a square of a complex modulus, $(\cdot)^H$ represents a conjugate transpose of a vector, $\text{diag}\{\cdot\}$ represents to converting the vector to a diagonal matrix, and $e^{j \cdot}$ represents an exponential form of complex number; and the constraint condition 1 is the minimum rate constraint of the user; the constraint condition 2 is the phase shift constraint of the intelligent omni-surface; and the constraint condition 3 is the length constraint of the total slot time of the time slot 1 and the time slot 2 after normalization.

The method for solving the optimization problem after setting with the constraint condition in the step 3 comprises:
  step 3-1: calculating the phase shift of the intelligent omni-surface; and
  step 3-2: calculating the transmit power of the user and the time slot length.

The method for the calculating the phase shift of the intelligent omni-surface in the step 3-1 in the present invention comprises:
  the method for calculating the phase shift $\theta_m^k$ of the $m^{th}$ element of the intelligent omni-surface in the time slot k is as follows:

$$\theta_m^k = \begin{cases} \theta_m^h - \theta_m^{g_k}, & \text{if } \theta_m^h - \theta_m^{g_k} \geq 0 \\ 2\pi + (\theta_m^h - \theta_m^{g_k}), & \text{if } \theta_m^h - \theta_m^{g_k} < 0 \end{cases}$$

wherein, $\theta_m^h$ and $\theta_m^{g_k}$ are phases of $m^{th}$ elements of vectors h and $g_k$ respectively, $k \in \{1,2\}$ and $m \in \{1,2,\ldots,M\}$.

The method for the calculating the transmit power of the user and the time slot length in the step 3-2 comprises:
  step 3-2-1: initializing a searching step-size $\Delta^t$ and a search index $\tau=0$;
  step 3-2-2, updating an iteration index $\tau=\tau+1$ and the time slot length $t_2=\tau \times \Delta t$;
  step 3-2-3, calculating the transmit power for the user;
  step 3-2-4: calculating the total power consumption of the system during the $\tau^{th}$ iteration:

$$P_{sum}^\tau = p_1 + p_2;$$

step 3-2-5, when $t_2<1$, executing the step 3-2-2; otherwise, executing step 3-2-6;
  step 3-2-6, according to all the obtained total power consumption of the system $\{P_{sum}^\tau\}$, calculating the optimal iteration index Top corresponding to the minimum total power consumption of the system, which is $$\tau_{op} = \min_\tau \{P_{sum}^\tau\};$$

and
  step 3-2-7, outputting the optimal time slot length $t_2^{op}=\tau_{op} \times \Delta t$; and outputting the optimal transmit power.

The method for calculating the transmit power of the user in the step 3-2-3 of the present invention is as follows:

$$p_1 = \frac{\sigma^2}{|h^H \Theta_1 g_1|^2} \left( 2^{\frac{R_1^{min}}{1-t_2}} - 1 \right)$$

$$p_2 = \frac{\sigma^2}{|h^H \Theta_2 g_2|^2} \left( 2^{\frac{R_2^{min}}{t_2}} - 1 \right).$$

The optimal transmit power in the step 3-2-7 is:

$$p_1^{op} = \frac{\sigma^2}{|h^H \Theta_1 g_1|^2} \left( 2^{\frac{R_1^{min}}{t_1^{op}}} - 1 \right)$$

$$p_2^{op} = \frac{\sigma^2}{|h^H \Theta_2 g_2|^2} \left( 2^{\frac{R_2^{min}}{t_2^{op}}} - 1 \right)$$

wherein, $p_1^{op}$ and $p_2^{op}$ represent optimal transmit powers of a user 1 and a user 2, respectively, while $t_1^{op}$ and $t_2^{op}$ represent optimal lengths of the time slot 1 and the time slot 2 respectively.

Beneficial Effects:
  the present invention provides the 360° omnidirectional communication coverage by using the intelligent omni-surface, so that the users distributed on both sides of the intelligent omni-surface can communicate with the base station with the assistance of the intelligent omni-surface, and the total power consumption of the system is reduced and the communication coverage area is improved by optimizing the phase shift of the intelligent omni-surface, the transmit power of the user and the allocated time slot length.

BRIEF DESCRIPTION OF THE DRAWINGS

The present invention is further described in detail with reference to the accompanying drawings and the detailed descriptions, and the advantages of the above and/or other aspects of the present invention will become clearer.

DETAILED DESCRIPTION

Figure 1:
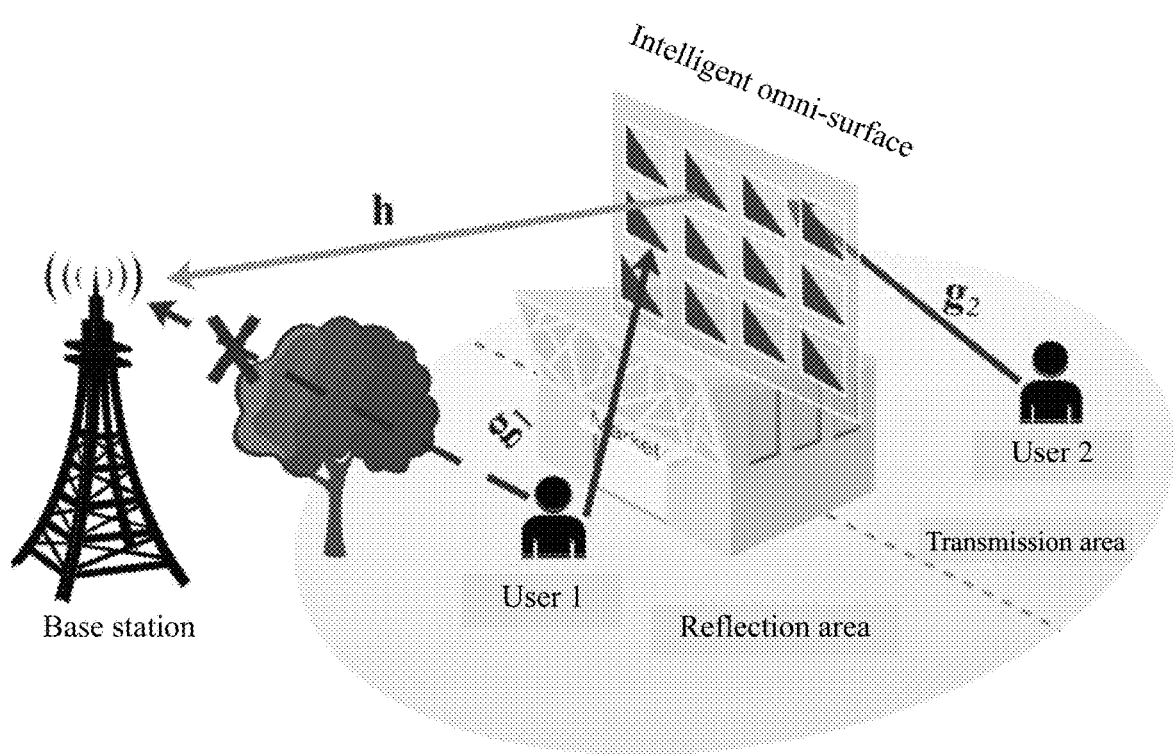
FIG. 1 is a schematic diagram of a system model of the present invention.

In order to overcome the shortcomings in the prior art, the present invention provides a communication system design method based on an intelligent omni-surface. The present invention provides the 360° omnidirectional communication coverage by using the intelligent omni-surface, so that the users distributed on both sides of the intelligent omni-surface can communicate with the base station with the assistance of the intelligent omni-surface, and the total power consumption of the system is reduced by optimizing the phase shift of the intelligent omni-surface, the transmit power of the user and the allocated time slot length.

The communication system design method based on the intelligent omni-surface is concretely realized as follows:
  the intelligent omni-surface is applied to an uplink communication, and a user communicates with a base station under the assistance of the intelligent omni-surface.

Each element of the intelligent omni-surface has two working modes, which are a reflection mode and a transmission mode; wherein, in the reflection mode, each element is capable of reflecting an incident signal; in the transmission mode, the incident signal is capable of being transmitted through the element of the intelligent omni-surface; the intelligent omni-surface works by using a time slot switching protocol, and two time slots are provided, which are a time slot 1 and a time slot 2 respectively. In the time slot 1, all elements of the intelligent omni-surface work in the reflection mode, and the covered communication area is a reflection area. In the time slot 2, all elements of the intelligent omni-surface work in the transmission mode, and the covered communication area is a transmission area.

Furthermore, the optimizing the communication system based on the intelligent omni-surface comprises the following steps of:

step (1-1): constructing an optimization problem by minimizing a total power consumption of the system as an objective function, and using a minimum rate constraint of a user, a phase shift constraint of the intelligent omni-surface and a length constraint of an allocated time slot as constraint conditions.

step (1-2): solving the constructed optimization problem minimizing the total power consumption of the system to obtain an optimization solution for minimizing the total power consumption of the system.

The optimization problem constructed in the step (1-1) is as follows:

$$\min_{p_k, t_k > 0, \theta_m^k} (p_1 + p_2)$$

a constraint condition 1: $R_k \geq R_k^{min}, k \in \{1, 2\}$ a constraint condition 2: $\theta_m^k \in [0, 2\pi), k \in \{1, 2\}, m \in \{1, 2, \ldots, M\}$ a constraint condition 3: $t_1 + t_2 = 1, 0 < t_1 < 1, 0 < t_2 < 1$ wherein, $(p_1+p_2)$ is the total power consumption of the system, $p_k$ is a transmit power of a user k, $t_k$ is a length of a time slot k, $\theta_m^k$ is a phase shift of an $m^{th}$ element of the intelligent omni-surface in the time slot k, $R_k^{min}$ is a minimum rate threshold value of the user k, $\pi$ is a ratio of circumference to diameter, M is a total number of the elements contained in the intelligent omni-surface, $$R_k = t_k \log_2\left(1 + \frac{p_k |h^H \Theta_k g_k|^2}{\sigma^2}\right)$$

is an achievable data rate of the user k, $h \in \mathbb{C}^{M \times 1}$ is a channel vector between the intelligent omni-surface and the base station, $g_k \in \mathbb{C}^{M \times 1}$ is a channel vector between the user k and the intelligent omni-surface, $\Theta_1 = \text{diag}\{e^{j\theta_{11}} e^{j\theta_{21}} \ldots e^{j\theta_{M1}}\}$ and $\Theta_2 = \text{diag}\{e^{j\theta_{12}} e^{j\theta_{22}} \ldots e^{j\theta_{M2}}\}$ are a reflected beamforming matrix and a transmitted beamforming matrix respectively, $\sigma^2$ is a variance of an additive white Gaussian noise, $\mathbb{C}^{M \times 1}$ represents a complex column vector of M dimension, $|\cdot|^2$ represents a square of a complex modulus, $(\cdot)^H$ represents a conjugate transpose of a vector, diag $\{\cdot\}$ represents to converting the vector to a diagonal matrix, and $e^{j\cdot}$ represents an exponential form of complex number. The constraint condition 1 is the minimum rate constraint of the user; the constraint condition 2 is the phase shift constraint of the intelligent omni-surface; and the constraint condition 3 is the length constraint of the total slot time of the time slot 1 and the time slot 2 after normalization.

In the step (1-2), the optimization solution for minimizing the total power consumption of the system comprises the following steps of:

step (1-2-1): calculating the phase shift of the intelligent omni-surface; and step (1-2-2): calculating the transmit power of the user and the time slot length.

In the step (1-2-1), the phase shift $\theta_m^k$ of the $m^{th}$ element of the intelligent omni-surface in the time slot k is obtained by the following calculation:

$$\theta_m^k = \begin{cases} \theta_m^h - \theta_m^{g_k}, & \text{if } \theta_m^h - \theta_m^{g_k} \geq 0 \\ 2\pi + (\theta_m^h - \theta_m^{g_k}), & \text{if } \theta_m^h - \theta_m^{g_k} < 0 \end{cases}$$

wherein, $\theta_m^h$ and $\theta_m^{g_k}$ are phases of $m^{th}$ elements of vectors h and $g_k$ respectively, $k \in \{1, 2\}$ and $m \in \{1, 2, \ldots, M\}$.

In the step (1-2-2), the transmit power of the user and the time slot length are obtained by the following process calculation:

step (1): initializing a searching step-size $\Delta t$ and a search index $\tau = 0$;

step (2): updating an iteration index $\tau = \tau + 1$ and the time slot length $t_2 = \tau \times \Delta t$;

step (3): calculating the transmit power for the user:

$$p_1 = \frac{\sigma^2}{|h^H \Theta_1 g_1|^2}\left(2^{\frac{R_1^{min}}{1-t_2}} - 1\right) \text{ and}$$

$$p_2 = \frac{\sigma^2}{|h^H \Theta_2 g_2|^2}\left(2^{\frac{R_2^{min}}{t_2}} - 1\right);$$

step (4): calculating the total power consumption of the system during the $\tau^{th}$ iteration:

$$P_{sum}^\tau = p_1 + p_2;$$

step (5): when $4\tau < 1$, executing the step 3-2-2; otherwise, executing step 3-2-6;

step (6): according to all the obtained total power consumption of the system $\{p_{sum}^\tau\}$, sum calculating the optimal iteration index $\tau_{op}$ corresponding to the minimum total power consumption of the system, which is $$\tau_{opp} = \min_\tau \{P_{sum}^\tau\};$$

and step (7): outputting the optimal time slot length $t_2^{op} = \tau_{op} \times \Delta t$; and outputting the optimal transmit power $$p_1^{op} = \frac{\sigma^2}{|h^H \Theta_1 g_1|^2}\left(2^{\frac{R_1^{min}}{t_1^{op}}} - 1\right) \text{ and}$$

$$p_2^{op} = \frac{\sigma^2}{|h^H \Theta_2 g_2|^2}\left(2^{\frac{R_2^{min}}{t_2^{op}}} - 1\right).$$

Embodiment

FIG. 1 shows a system model of the present invention. A communication system based on an intelligent omni-surface comprises a base station, an omni-directional intelligent hypersurface and two users. A user 1 and a user 2 are located on both sides of the intelligent omni-surface respectively. It is assumed that both the base station and the user are equipped with an antenna, and the intelligent omni-surface consists of m elements. Considering the uplink communication, direct link communication between the user and the base stations is impossible due to channel blockage or serious fading, and the communication with the base stations must be assisted by the intelligent omni-surface. Further, it is assumed that the base station can accurately obtain all channel state information between the base station and the intelligent omni-surface and between the user and the intelligent omni-surface.

Each element of the intelligent omni-surface in the step 1 has two working modes, which are a reflection mode and a transmission mode; wherein, in the reflection mode, each element is capable of reflecting an incident signal; and in the transmission mode, the incident signal is capable of being transmitted through the element of the intelligent omni-surface. The intelligent omni-surface works by using a time slot switching protocol, and two time slots are provided, which are a time slot 1 and a time slot 2 respectively. In the time slot 1, all elements of the intelligent omni-surface work in the reflection mode, and the covered communication area is a reflection area. In the time slot 2, all elements of the intelligent omni-surface work in the transmission mode, and the covered communication area is a transmission area, as shown in FIG. 1. $\theta_m^1$ and $\theta_m^2$ are set as the phase shifts of the $m^{th}$ element of the intelligent omni-surface in the time slot 1 and the time slot 2 respectively. So, the reflected beamforming matrix and the transmitted beamforming matrix are represented as $\Theta_1 = \text{diag}\{e^{j\theta_1 1} e^{j\theta_2 1} \ldots e^{j\theta_M 1}\}$ and $\Theta_2 = \text{diag}\{e^{j\theta_1 2} e^{j\theta_2 2} \ldots e^{j\theta_M 2}\}$ respectively, wherein $\text{diag}\{\bullet\}$ represents to converting the vector to a diagonal matrix, and $e^{j\bullet}$ represents an exponential form of complex number.

$h \in C^{M \times 1}$ is set to represent a channel between the intelligent omni-surface and the base station, $g_k \in C^{M \times 1}$ represents a channel between the user k and the intelligent omni-surface, and $C^{M \times 1}$ represents a complex column vector of M dimension. In the time slot k, a signal received by the base station is as follows:

$$y_k = h^H \Theta_k g_k x_k + z_k, k \in \{1, 2\} \quad \text{Formula (1)}$$

wherein, $x_k$ represents a signal sent by the user k, $z_k$ is an additive white Gaussian noise of the base station in the time slot k, with a mean value of 0, and a variance is $\sigma^2$.

According to the formula (1), a rate $R_k$ of the user k is:

$$R_k = t_k \log_2\left(1 + \frac{p_k |h^H \Theta_k g_k|^2}{\sigma^2}\right) \quad \text{Formula (2)}$$

wherein, $p_k$ is a transmit power of a user k, $t_k$ is a length of a time slot k, and $|\bullet|^2$ represents a square of a complex modulus.

With the consideration of the minimum rate constraint of the user, the phase shift constraint of the intelligent omni-surface and the length constraint of the allocated time slot, the optimization problem for minimizing the total power consumption of the system is as follows:

$$\min_{p_k, t_k > 0, \theta_m^k} (p_1 + p_2) \quad \text{Formula (3.a)}$$

-continued a constraint condition: $R_k \geq R_k^{min}, k \in \{1, 2\}$    Formula (3.b)

a constraint condition: $\theta_m^k \in [0, 2\pi)$,    Formula (3.c)

$$k \in \{1, 2\}, m \in \{1, 2, \ldots, M\}$$

a constraint condition: $t_1 + t_2 = 1, 0 < t_1 < 1, 0 < t_2 < 1$    Formula (3.d)

wherein, ($p_1 + p_2$) is the total power consumption of the system, $R_k^{min}$ is a minimum rate threshold value of the user k, and $\pi$ is a ratio of circumference to diameter. The constraint condition (3.b) is the minimum rate constraint of the user; the constraint condition (3.c) is the phase shift constraint of the intelligent omni-surface; and the constraint condition (3.d) is the length constraint of the total slot time of the time slot 1 and the time slot 2 after normalization The optimization problem is solved to obtain the optimization solution for minimizing the total power consumption of the system. The concrete process of the solution comprises the following steps of:

step (1-1): calculating the phase shift of the intelligent omni-surface; and step (1-2): calculating the transmit power of the user and the time slot length.

The specific implementation process of the above steps is described in detail below.

(I) Calculating the Phase Shift of the Intelligent Omni-Surface

The phase shift of the intelligent omni-surface IS obtained by maximizing an equivalent combined channel gain of a user, which is:

$$\max_{\theta_m^k} |h^H \Theta_k g_k|^2 \quad \text{Formula (4.a)}$$

constraint condition: $\theta_m^k \in [0, 2\pi)$,    Formula (4.b)

$$k \in \{1, 2\}, m \in \{1, 2, \ldots, M\}$$

$$h_m = |h_m| e^{j\theta_m^h} \text{ and } g_{k,m} = |g_{k,m}| e^{j\theta_m^{g_k}}$$

are set to represent $m^{th}$ elements of vectors $h$ and $g_k$ respectively, $|h_m|$ and $\theta_m^h$ are an amplitude and a phase of $h_m$ respectively, while $|g_{k,m}|$ and $\theta_m^{g_k}$ are an amplitude and a phase of $g_{k,m}$ respectively. The objective function $|h^H \Theta_k g_k|^2$ in the formula (4) has the following relationship:

$$|h^H \Theta_k g_k| = \left|\sum_{m=1}^{M} |h_m||g_{k,m}| e^{j\theta_m^k - \theta_m^h + \theta_m^{g_k}}\right| \leq \sum_{m=1}^{M} |h_m||g_{k,m}| \quad \text{Formula (5)}$$

When and only when $\theta_m^k - \theta_m^h + \theta_m^{g_k} = 0$ or $\theta_n^k - \theta_m^h + \theta_m^{g_k} = 2\pi$, the equality in (5) will hold.

Therefore, the phase shift of the $m^{th}$ element of the intelligent omni-surface is obtained by the following formula:

$$\theta_m^k = \begin{cases} \theta_m^h - \theta_m^{g_k}, & \text{if } \theta_m^h - \theta_m^{g_k} \geq 0 \\ 2\pi + (\theta_m^h - \theta_m^{g_k}), & \text{if } \theta_m^h - \theta_m^{g_k} < 0 \end{cases} \quad \text{Formula (6)}$$

(II) Calculating the Transmit Power of the User and the Time Slot Length

For the given phase shift $\{\theta_m^k\}$ of the intelligent omni-surface phase shift, the optimization problem of the transmit power of the user and the time slot length in the optimization problem (3) is represented as:

$$\min_{p_k, t_k > 0} (p_1 + p_2) \quad \text{Formula (7.a)}$$

constraint condition: $R_k \geq R_k^{min}, k \in \{1, 2\}$ Formula (7.b)

constraint condition: $t_1 + t_2 = 1, 0 < t_1 < 1, 0 < t_2 < 1$ Formula (7.c)

The equivalent conversion is performed on the constraint condition formula (7.b) to $$\text{obtain: } p_k \geq \frac{\sigma^2}{|h^H \Theta_k g_k|^2} \left( 2^{\frac{R_k^{min}}{t_k}} - 1 \right).$$

The objective function of the optimization problem (7) is to minimize the sum of the transmit powers of the user 1 and the user 2. Therefore, when the transmit powers p1 and p2 are simultaneously minimized, which is:

$$p_k = \frac{\sigma^2}{|h^H \Theta_k g_k|^2} \left( 2^{\frac{R_k^{min}}{t_k}} - 1 \right) \quad \text{Formula (8)}$$

the total power consumption $(p_1+p_2)$ of the system reaches a minimum value, wherein |•| is a modulus of a complex number.

It can be seen from the formula (8), the transmit power $p_k$ is a function of the time slot length $t_k$. As $t_1=1-t_2$, and $0 < t_2 < 1$, the total power consumption is represented as a one-dimensional function of the time slot length $t_2$. Therefore, the optimal time slot length is obtained by a one-dimensional search algorithm. The specific process of using the one-dimensional search algorithm to solve the transmit power of the user and the time slot length is as follows:

step (1): initializing a searching step-size $\Delta t$ and a search index $\tau=0$;

step (2): updating an iteration index $\tau=\tau+1$ and the time slot length $t_2=\tau \times \Delta$;

step (3): calculating the transmit power for the user:

$$p_1 = \frac{\sigma^2}{|h^H \Theta_1 g_1|^2} \left( 2^{\frac{R_1^{min}}{1-t_2}} - 1 \right) \text{ and}$$

$$p_2 = \frac{\sigma^2}{|h^H \Theta_2 g_2|^2} \left( 2^{\frac{R_2^{min}}{t_2}} - 1 \right);$$

step (4): calculating the total power consumption of the system during the $\tau^{th}$ iteration:

$$P_{sum}^{\tau} = p_1 + p_2;$$

step (5): when $t_2 < 1$, executing the step 3-2-2; otherwise, executing step 3-2-6;

step (6): according to the obtained $\{P_{sum}^{\tau}\}$, calculating the optimal iteration index $\tau_{op}$ corresponding to the minimum $P_{sum}^{\tau}$, which is $$\tau_{op} = \min_{\tau} \{P_{sum}^{\tau}\};$$

and step (7): outputting the optimal time slot length $t_2^{op} = \tau_{op} \times \Delta t$; and outputting the optimal transmit power $$p_1^{op} = \frac{\sigma^2}{|h^H \Theta_1 g_1|^2} \left( 2^{\frac{R_1^{min}}{t_1^{op}}} - 1 \right) \text{ and}$$

$$p_2^{op} = \frac{\sigma^2}{|h^H \Theta_2 g_2|^2} \left( 2^{\frac{R_2^{min}}{t_2^{op}}} - 1 \right).$$

Then, the present invention is simulated and a performance thereof is analyzed. In the simulation, it is assumed that coordinates of the base station and the intelligent omni-surface are (0 m, 20 m) and (50 m, 20 m) respectively, and the coordinates of the user 1 and the user 2 are (x1, 0 m) and (x2, 0 m) respectively, wherein x1 is randomly distributed between (40 m, 50 m) and x2 is randomly distributed between (50 m, 60 m). All the channels involved are modeled by a Rice channel, and a path loss exponent is assumed to be 2.2. Without the loss of generality, it is assumed that the minimum rate threshold value of the user is $R_1^{min} = R_2^{min} = R_{min}$ (bit/s/Hz).

Figure 2:
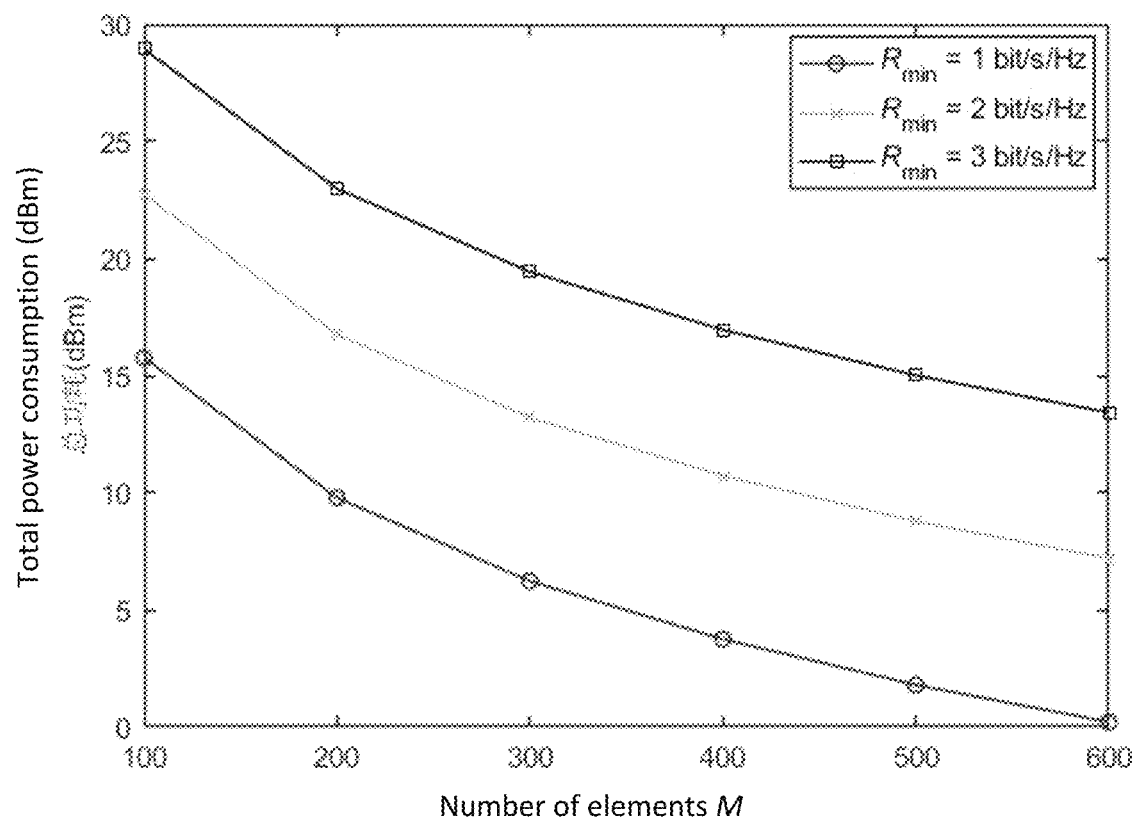
FIG. 2 is a schematic change diagram of a total power consumption of the system according to the present invention with a number of intelligent omni-surface elements.

As shown in FIG. 2, under different minimum rate threshold values $R_{min}$, it is a relationship diagram between the total power consumption of the system of the present invention and the number of the intelligent omni-surface elements M. It can be seen from the figure, when the minimum rate threshold value $R_{min}$ is fixed, the total power consumption of the system decreases with the increase of the number of the intelligent omni-surface elements M. When the number of the intelligent omni-surface elements M is fixed, the total power consumption of the system increases with the increase of the minimum rate threshold value $R_{min}$.

Figure 3:
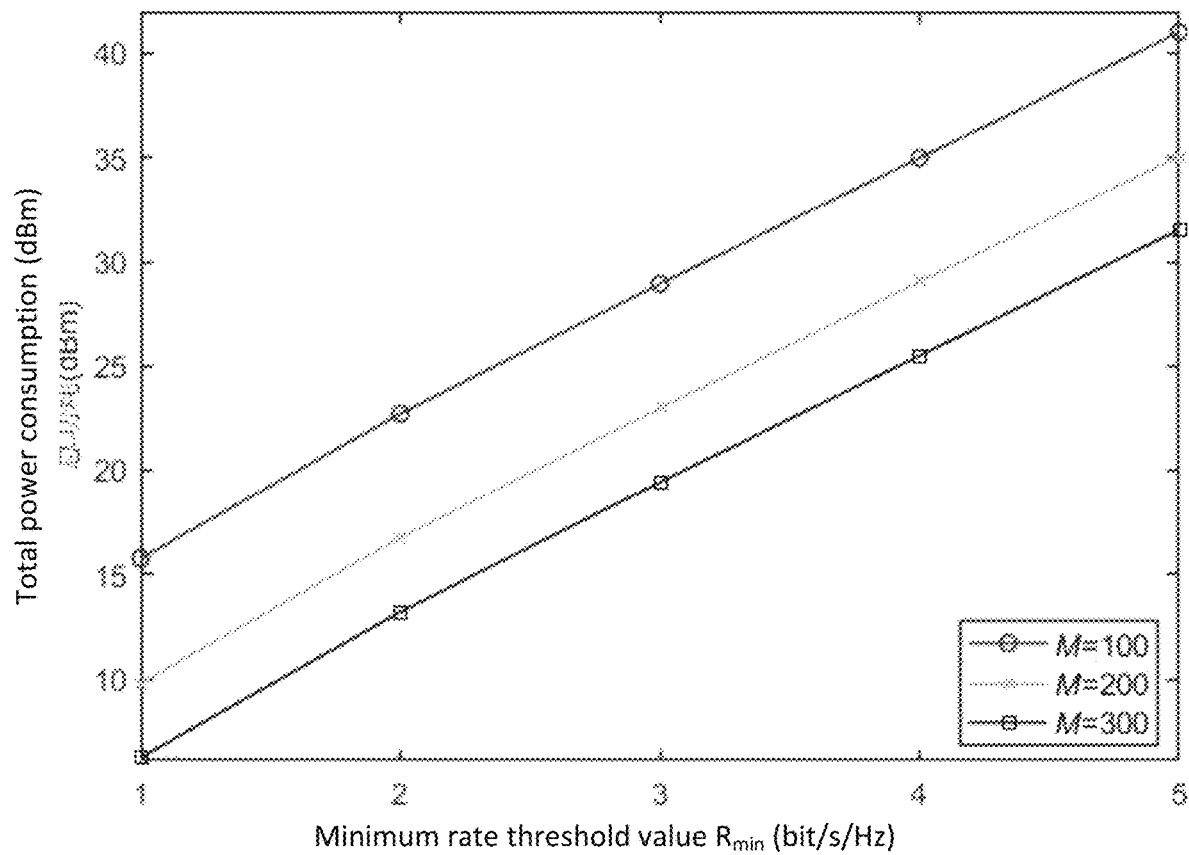
FIG. 3 is a schematic change diagram of the total power consumption of the system according to the present invention with a minimum rate threshold value.

As shown in FIG. 3, it is the relationship diagram between the total power consumption of the system of the present invention and the minimum rate threshold value $R_{min}$ is shown under different numbers M of the intelligent omni-surface elements. It can be seen from the figure, when the number of the intelligent omni-surface elements M is fixed, the total power consumption of the system increases with the increase of the minimum rate threshold value $R_{min}$. When the minimum rate threshold value $R_{min}$ is fixed, the total power consumption of the system decreases with the increase of the number of the intelligent omni-surface elements M.

The intelligent omni-surface comprises a computer readable medium operable on a computer with memory for the communication system method, and program instructions for executing the communication system method.

The present invention provides the idea and the method of the communication system method based the intelligent omni-surface. There are many methods and ways to realize the technical solutions. The above only describes the specific embellishments of the present invention. It should be pointed out that those of ordinary skills in the art can make some improvements and embellishments without departing from the principle of the present invention, and these improvements and embellishments should also be regarded as falling with the scope of protection of the present inven-

What is claimed is:

1. A communication system design method based on an intelligent omni-surface, comprising a non-transitory computer readable medium operable on a computer with memory for the communication system design method, and comprising program instructions for executing the following steps of:
   step 1: constructing an optimized system by minimizing a total power consumption of the communication system as an objective function, the communication system being a communication system based on an intelligent omni-surface;
   step 2: setting a constraint condition for the optimized system constructed in the step 1, the constraint condition comprising: a minimum rate constraint of a user equipment, a phase shift constraint of the intelligent omni-surface and a length constraint of an allocated time slot; and
   step 3: communicating, by the user equipment, with a base stion under the assistance of the intelligent omni-surface by applying the set constraint condition to uplink communication for minimizing the total power consumption of the communication system and improving communication coverage area.

2. The communication system design method based on the intelligent omni-surface according to claim 1, wherein each element of the intelligent omni-surface in the step 1 has two working modes, which are a reflection mode and a transmission mode; wherein, in the reflection mode, each element is capable of reflecting an incident signal; in the transmission mode, the incident signal is capable of being transmitted through the element of the intelligent omni-surface; the intelligent omni-surface works by using a time slot switching protocol, and two time slots are provided, which are a time slot 1 and a time slot 2 respectively; in the time slot 1, all elements of the intelligent omni-surface work in the reflection mode, and the covered communication area is a reflection area; and in the time slot 2, all elements of the intelligent omni-surface work in the transmission mode, and the covered communication area is a transmission area.

3. The communication system design method based on the intelligent omni-surface according to claim 2, wherein the constructing the optimized system in the step 1 is as follows:

$$\min_{p_k, t_k > 0, \theta_m^k} (p_1 + p_2)$$

wherein, $(p_1+p_2)$ is the total power consumption of the system, $p_k$ is a transmit power of a user k, $t_k$ is a length of a time slot k, and $\theta_m^k$ is a phase shift of an $m^{th}$ element of the intelligent omni-surface in the time slot k.

4. The communication system design method based on the intelligent omni-surface according to claim 3, wherein the constraint condition in the step 2 comprises:

a constraint condition 1: $R_k \geq R_k^{min}, k \in \{1, 2\}$ a constraint condition 2: $\theta_m^k \in [0, 2\pi), k \in \{1, 2\}, m \in \{1, 2, \cdots, M\}$ a constraint condition 3: $t_1 + t_2 = 1, 0 < t_1 < 1, 0 < t_2 < 1$ wherein, $R_k^{min}$ is a minimum rate threshold value of the user equipment k, $\pi$ is a ratio of circumference to diameter, M is a total number of the elements contained in the intelligent omni-surface, $$R_k = t_k \log_2\left(1 + \frac{p_k |h^H \Theta_k g_k|^2}{\sigma^2}\right)$$

is an achievable data rate of the user equipment k, $h \in C^{M \times 1}$ is a channel vector between the intelligent omni-surface and the base station, $g_k \in C^{M \times 1}$ is a channel vector between the user equipment k and the intelligent omni-surface, $\Theta_1 = \text{diag}\{e^{j\theta_{11}} e^{j\theta_{21}} \ldots e^{j\theta_{M1}}\}$ and $\Theta_2 = \text{diag}\{e^{j\theta_{12}} e^{j\theta_{22}} \ldots e^{j\theta_{M2}}\}$ are a reflected beamforming matrix and a transmitted beamforming matrix respectively, $\sigma^2$ is a variance of an additive white Gaussian noise, $C^{M \times 1}$ represents a complex column vector of M dimension, $|\cdot|^2$ represents a square of a complex modulus, $(\cdot)^H$ represents a conjugate transpose of a vector, diag$\{\cdot\}$ represents to converting the vector to a diagonal matrix, and $e^{j\cdot}$ represents an exponential form of complex number; and
the constraint condition 1 is the minimum rate constraint of the user equipment; the constraint condition 2 is the phase shift constraint of the intelligent omni-surface; and the constraint condition 3 is the length constraint of the total slot time of the time slot 1 and the time slot 2 after normalization.

5. The communication system design method based on the intelligent omni-surface according to claim 4, wherein the method for communicating, by a user equipment, with a base stion under the assistance of the intelligent omni-surface by applying the set constraint condition to uplink communication in the step 3 comprises:
   step 3-1: calculating the phase shift of the intelligent omni-surface; and
   step 3-2: calculating the transmit power of the user equipment and the time slot length.

6. The communication system design method based on the intelligent omni-surface according to claim 5, wherein the method for the calculating the phase shift of the intelligent omni-surface in the step 3-1 comprises:
   the method for calculating the phase shift $\theta_m^k$ of the $m^{th}$ element of the intelligent omni-surface in the time slot k is as follows:

$$\theta_m^k = \begin{cases} \theta_m^h - \theta_m^{g_k}, & \text{if } \theta_m^h - \theta_m^{g_k} \geq 0 \\ 2\pi + (\theta_m^h - \theta_m^{g_k}), & \text{if } \theta_m^h - \theta_m^{g_k} < 0 \end{cases}$$

wherein, $\theta_m^h$ and $\theta_m^{g_k}$ are phases of $m^{th}$ elements of vectors h and $g_k$ respectively, $k \in \{1, 2\}$ and $m \in \{1, 2, \ldots, M\}$.

7. The communication system design method based on the intelligent omni-surface according to claim 6, wherein the method for the calculating the transmit power of the user equipment and the time slot length in the step 3-2 comprises:
   step 3-2-1: initializing a searching step-size $\Delta t$ and a search index $\tau=0$;
   step 3-2-2: updating an iteration index $\tau=\tau+1$ and the time slot length $t_2=\tau \times \Delta t$;
   step 3-2-3: calculating the transmit power for the user equipment;

step 3-2-4: calculating the total power consumption of the system during the $\tau^{th}$ iteration:

$$P_{sum}^{\tau} = p_1 + p_2;$$

step 3-2-5: when $t_2 < 1$, executing the step 3-2-2; otherwise, executing step 3-2-6;

step 3-2-6: according to all the obtained total power consumption of the system $\{P_{sum}^{\tau}\}$, calculating the optimal iteration index $\tau_{op}$ corresponding to the minimum total power consumption of the system, which is $$\tau_{op} = \min_{\tau}\{P_{sum}^{\tau}\};$$

and step 3-2-7: outputting the optimal time slot length $t_2^{op} = \tau_{op} \times \Delta t$; and outputting the optimal transmit power.

8. The communication system design method based on the intelligent omni-surface according to claim 7, wherein the method for calculating the transmit power of the user equipment and the time slot length in the step 3-2-3 is as follows:

$$p_1 = \frac{\sigma^2}{|h^H \Theta_1 g_1|^2}\left(2^{\frac{R_1^{min}}{1-t_2}} - 1\right)$$

$$p_2 = \frac{\sigma^2}{|h^H \Theta_2 g_2|^2}\left(2^{\frac{R_2^{min}}{t_2}} - 1\right).$$

9. The communication system design method based on the intelligent omni-surface according to claim 8, wherein the optimal transmit power in the step 3-2-7 is:

$$p_1^{op} = \frac{\sigma^2}{|h^H \Theta_1 g_1|^2}\left(2^{\frac{R_1^{min}}{t_1^{op}}} - 1\right)$$

$$p_2^{op} = \frac{\sigma^2}{|h^H \Theta_2 g_2|^2}\left(2^{\frac{R_2^{min}}{t_2^{op}}} - 1\right)$$

wherein, $p_1^{op}$ and $p_2^{op}$ represent optimal transmit powers of a user equipment 1 and a user equipment 2 respectively, while $t_1^{op}$ and $t_2^{op}$ represent optimal lengths of the time slot 1 and the time slot 2 respectively.

* * * * *